(12) United States Patent
Schultheiss

(10) Patent No.: US 7,752,911 B2
(45) Date of Patent: Jul. 13, 2010

(54) WAVEGUIDE TRANSITION FOR A FILL LEVEL RADAR

(75) Inventor: Daniel Schultheiss, Hornberg (DE)

(73) Assignee: Vega Grieshaber KG, Wolfach (DE)

( * ) Notice: Subject to any disclaimer, the term of this patent is extended or adjusted under 35 U.S.C. 154(b) by 126 days.

(21) Appl. No.: 11/599,115

(22) Filed: Nov. 13, 2006

(65) Prior Publication Data

US 2007/0109178 A1 May 17, 2007

Related U.S. Application Data

(60) Provisional application No. 60/736,460, filed on Nov. 14, 2005.

(30) Foreign Application Priority Data

Nov. 14, 2005 (DE) .................. 10 2005 054 233

(51) Int. Cl.
*G01F 23/284* (2006.01)
*H01P 5/107* (2006.01)
(52) U.S. Cl. ..................... 73/290 R; 333/26
(58) Field of Classification Search .......... 333/26; 73/290 R
See application file for complete search history.

(56) References Cited

U.S. PATENT DOCUMENTS

| 5,528,074 | A * | 6/1996 | Goto et al. .............. 257/664 |
| 5,770,981 | A * | 6/1998 | Koizumi et al. ............ 333/26 |
| 5,808,519 | A * | 9/1998 | Gotoh et al. .............. 333/26 |
| 6,239,669 | B1 * | 5/2001 | Koriyama et al. .......... 333/26 |
| 6,870,438 | B1 | 3/2005 | Shino et al. |
| 6,958,662 | B1 * | 10/2005 | Salmela et al. ........... 333/26 |
| 2003/0141940 | A1 | 7/2003 | Le Bihan et al. |
| 2003/0168674 | A1 | 9/2003 | Muller et al. |
| 2005/0083228 | A1 * | 4/2005 | Edvardsson ............ 342/124 |
| 2005/0200424 | A1 * | 9/2005 | Takeda et al. ............ 333/26 |
| 2006/0145777 | A1 | 7/2006 | Mueller |

FOREIGN PATENT DOCUMENTS

| DE | 101 34 204 | 9/2002 |
| DE | 102 43 671 | 3/2004 |
| EP | 1 327 283 | 2/1985 |
| EP | 0 874 415 | 10/1998 |
| EP | 1 014 471 | 6/2000 |
| EP | 1 366 538 | 9/2002 |
| EP | 1 276 169 | 1/2003 |
| EP | 1 367 668 | 12/2003 |
| EP | 1 592 081 | 2/2005 |
| EP | 1 592 082 | 11/2005 |
| JP | 2003-174263 | 6/2003 |
| WO | 01/88488 | 11/2001 |
| WO | 02/071533 | 9/2002 |
| WO | 2004/008569 | 1/2004 |
| WO | 2005/038414 | 4/2005 |

* cited by examiner

*Primary Examiner*—Benny T. Lee
(74) *Attorney, Agent, or Firm*—Fay Kaplun & Marcin, LLP

(57) ABSTRACT

A waveguide transition for a fill level radar may include a printed circuit board in which a resonator is integrated. Together with a coupling element, the resonator is used for decoupling high-frequency waves from a feed line, that is also integrated in the printed circuit board, to a waveguide that is screwed onto the printed circuit board. There is thus no need to provide an external resonator.

14 Claims, 3 Drawing Sheets

WAVEGUIDE TRANSITION FOR A FILL LEVEL RADAR

PRIORITY CLAIM

This application claims the benefit of the filing date of U.S. Provisional Patent Application Ser. No. 60/736,460 filed Nov. 14, 2005, and of German Patent Application Serial No. DE 10 2005 054 233.6 filed Nov. 14, 2005, the disclosures of which are hereby incorporated herein by reference.

FIELD OF THE INVENTION

The present invention relates to fill level measuring. In particular, the present invention relates to a waveguide transition for a fill level radar, a fill level radar to determine the fill level in a tank, the use of a waveguide transition for fill level measuring, as well as to a method for producing such a waveguide transition.

TECHNOLOGICAL BACKGROUND OF THE INVENTION

Known fill level measuring devices that use electromagnetic waves to measure fill levels comprise electronics that generate the electromagnetic waves. The generated electromagnetic waves are then guided to the antenna, for example by means of a coaxial conductor, and are coupled into the antenna by way of a corresponding coupling device.

For example from US20030141940A1 and US20030168674A1 two microstrip-waveguide transitions are known, in which in each case the high-frequency substrate together with a coupling element reaches into a waveguide. However, in the case of both these documents the waveguide may have to be closed with a resonator on the other side of the printed circuit board. This resonator may have to be very precisely aligned.

In order to reduce the dimensions of the arrangement (with identical focusing of the radiation transmitted by the antenna) it may be desirable to increase the frequency of the generated electromagnetic waves. However, as a result of this there may be increased demands on the electronics that generate the electromagnetic waves, and on the receiving- and evaluation units. In particular, in this arrangement it may be important to achieve neat coupling or decoupling of the electromagnetic waves to be transmitted to or received from, in or from the waveguide that connects the antenna to the electronics.

According to one exemplary embodiment of the present invention a waveguide transition for a fill level radar is stated, with the waveguide transition comprising a multilayer printed circuit board, a feed line for conducting electromagnetic waves, and a decoupling unit that comprises a coupling element and a resonance space for decoupling the electromagnetic waves from the feed line to a waveguide, wherein the resonance space is integrated in the printed circuit board.

Accordingly, the waveguide transition thus comprises a coupling device that is integrally embedded in the printed circuit board. There is no need for an external resonator. Instead, decoupling of the electromagnetic waves from the feed line to the waveguide takes place directly within the printed circuit board. By integrating the decoupling device in the printed circuit board, integral production of the decoupling unit may take place during the production process or during processing of the printed circuit board. Since no external resonator has been provided for the decoupling unit there may be no problems with mechanical tolerances that may occur when the resonator is attached to the printed circuit board.

The printed circuit board may comprise several conductor planes, which are interconnected by way of electrical leadthroughs and which may carry corresponding electronic components.

This may provide improved decoupling or coupling of a high-frequency wave from a conductor to a waveguide.

According to a further exemplary embodiment of the present invention the printed circuit board comprises a first layer and a second layer, wherein the decoupling unit is integrated in the first layer, wherein the second layer comprises an insulating material, and wherein the second layer is arranged above the first layer so that it covers the decoupling unit.

According to a further exemplary embodiment of the present invention the waveguide transition further comprises a third layer that is arranged between the first layer and the second layer, wherein the first layer is an insulating printed circuit board substrate material, and wherein the third layer is a thin metallization coating.

According to this exemplary embodiment of the present invention the insulating printed circuit board substrate material, in which the resonator of the decoupling unit is located, may be coated by a metallization coating. On this metallization coating the second layer may be arranged in a plate-shaped manner. In this way a sandwich may be formed by the printed circuit board substrate and the second layer, between which a metallization coating is arranged. This metallization coating may not only serve as a mass area for a microstrip line on the second layer, but also as a waveguide wall in the resonator of the decoupling unit.

According to a further exemplary embodiment of the present invention the first layer is metallic.

In this case there may be no need to provide metallization in the form of a third layer.

According to a further exemplary embodiment of the present invention the decoupling unit is designed as a coupling element in conjunction with a resonator.

The resonator may be a hollow space in the first layer, which hollow space is for example generated by an etching process, a milling process, a drilling process or the like.

According to a further exemplary embodiment of the present invention the depth of the resonator corresponds to the thickness of the first layer.

In this case the hollow space of the resonator may for example simply be drilled out of the first layer (in the form of a drilled through-hole in the first layer), or the first layer may simply be etched through completely.

According to a further exemplary embodiment of the present invention the second layer is a high-frequency substrate.

The above may, for example, be a Rogers RT DUROID™ (PTFE composite material) substrate. It may thus be possible to couple high-frequency waves, which propagate within the second layer, into the resonator so that subsequently they may be coupled into the waveguide (which is for example an external waveguide).

According to a further exemplary embodiment of the present invention the first layer is a high-frequency substrate.

According to a further exemplary embodiment of the present invention the resonator is filled with a dielectric material.

According to a further exemplary embodiment of the present invention the second layer comprises a leadthrough in the region of the decoupling unit so as to provide pressure equalization between the resonator and the environment.

In this way bursting open or cracking of the multilayer arrangement may be prevented in the case of considerable fluctuations in temperature, which fluctuations might otherwise result in enormous pressure differentials between the interior of the resonator and the environment.

According to a further exemplary embodiment of the present invention the feed line is essentially integrated in the second layer.

In this way it may be possible to design both the decoupling unit and the feed line as integral units formed during the process of producing the supporting board. In this case there may be no need for any mechanical adjustment between the decoupling unit and the feed line because both may be already firmly integrated in the supporting board.

According to a further exemplary embodiment of the present invention the feed line is designed as a microstrip.

According to a further exemplary embodiment of the present invention the feed line is designed to conduct electromagnetic waves of a frequency of between 60 GHz and 100 GHz, wherein the decoupling unit is designed for decoupling electromagnetic waves of a frequency of between 60 GHz and 100 GHz from the feed line to the waveguide.

Thus, decoupling of high-frequency electromagnetic waves from a printed circuit board to a waveguide is stated, which decoupling may be designed to cope even with frequencies exceeding 60 GHz, without this resulting in problems relating to mechanical tolerances or adjustment.

According to a further exemplary embodiment of the present invention the waveguide transition is integrally produced in a single process of producing the printed circuit board.

According to a further exemplary embodiment of the present invention a fill level radar is stated that is designed for determining the fill level in a tank, comprising an antenna for transmitting and/or receiving electromagnetic waves, a feed device for feeding the electromagnetic waves to the antenna, wherein the feed device further comprises a waveguide for conveying the electromagnetic waves between the antenna and the feed line, and wherein the feed device comprises a waveguide transition as described above.

Such a fill level radar may not comprise an external resonator in order to couple the generated high-frequency waves into the waveguide. Instead, the resonator may be directly integrated in the printed circuit board. In this way tolerance problems associated with the installation of the resonator may be prevented. Furthermore, the number of mechanical components may be reduced, which in turn results in a reduction in installation expenditure. In particular, such a fill level radar is suitable also for high-frequency radiation exceeding 60 GHz.

According to a further exemplary embodiment of the present invention, by way of an attachment means, the waveguide is connected to the supporting board in such a way that the electromagnetic waves can be decoupled, by way of the decoupling unit, from the feed line to the waveguide.

Furthermore, the use of a waveguide transition according to the invention for fill level measuring is stated.

Moreover, a method for producing such a waveguide transition is stated, in which a first layer is provided, a resonator is created, in the first layer, for decoupling electromagnetic waves from a feed line to a waveguide, a second layer is created, and the feed line is essentially created in the second layer, for conducting the electromagnetic waves, wherein the resonator is integrated in the first layer.

In this way a method may be provided, by means of which integral production of the waveguide transition during the process of printed circuit board production may be provided. In this arrangement the resonator may form an integral part of the printed circuit board.

According to a further exemplary embodiment of the present invention the method further comprises the creation of a third layer, which is arranged between the first layer and the second layer, wherein the first layer is designed as an insulating printed circuit board substrate material, and wherein the third layer is metallic.

According to a further exemplary embodiment of the present invention the creation of the decoupling unit comprises an etching step, a milling step, or a laser drilling step, which if need be is followed by a metallization step.

Further exemplary embodiments of the invention are stated in the subordinate claims.

BRIEF DESCRIPTION OF THE DRAWINGS

Below, exemplary embodiments of the present invention are described with reference to the figures.

DETAILED DESCRIPTION OF THE INVENTION

Figure 1:
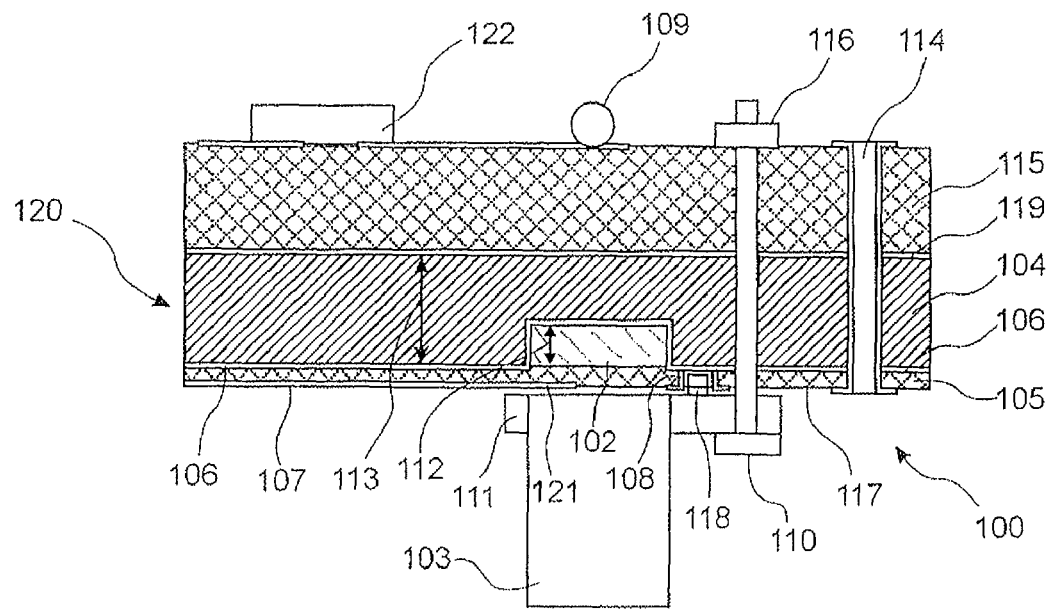
FIG. 1 is a diagrammatic cross-sectional view of a waveguide transition according to one exemplary embodiment of the present invention.

The illustrations in the figures are diagrammatic and not to scale. In the following description of the figures, the same reference characters are used for identical or similar elements.

FIG. 1 is a diagrammatic cross-sectional view of a waveguide transition for a fill level radar according to one exemplary embodiment of the present invention. As shown in FIG. 1, the waveguide transition 100 essentially comprises a printed circuit board 120, comprising several layers (104, 105, 115), in which a resonance space 102 is embedded. On the bottom of the printed circuit board 120 a layer made of a high-frequency substrate 105 is arranged in a board-like manner. On the HF substrate 105 there is a microstrip line 107 (see also FIG. 3) for conveyance of the electromagnetic waves from a signal source (not shown in FIG. 1) to the coupling element 121. The coupling element 121 is for example an extension of the microstrip line 107, which leads into the waveguide comprising the waveguide piece 103 and the resonance space 102.

However, the feed line 107 may for example also be designed as a strip line or within a triplate. In the case of a triplate, the feed line 107 is located in the interior layer.

A waveguide 103 is connected to the high-frequency substrate 105, which may for example be arranged as a Rogers RT DUROID™ substrate or as a TEFLON™ (PTFE) substrate or some other insulating material. In this arrangement the waveguide may be glued onto the substrate 105. As an alternative, as shown in FIG. 1, the waveguide may be attached with the use of attachment means 110, 111, i.e. it may be screwed, riveted, pinned or otherwise attached to the waveguide transition 100. In the present case the attachment means 111 is a flange that is firmly connected to the waveguide. The attachment means 110 is for example a screw that leads through the sandwich 120 and on the rear is held by a corresponding nut 116.

The resonance space 102 has a depth 112 of between, for example, 0.5 and 0.8 mm. Such dimensioning (which is purely exemplary) may correspond to a frequency of 60 to 80 GHz, or even 100 GHz or 120 GHz or more. In the case of higher frequencies, dimensioning of the resonator may of course be smaller.

The resonance space is for example made by milling or drilling. In the case of small dimensions, in particular also etching processes can be considered, as known from the process of producing printed circuit boards or in semiconductor process technology. In particular by means of photolithographic structuring methods and etching methods, dimensions in the micrometer range or below can be achieved.

Laser drilling, in which printed circuit board material is removed by means of a laser beam, provides a further option of producing the resonator.

During production of the waveguide transition 100 the resonance space 102 is made in the printed circuit board layer 104. The printed circuit board layer 104 may for example be woven glass fiber reinforced epoxy resin material (e.g. FR-4). If the printed circuit board layer 104 comprises an insulating material, then metallization 106 takes place on the underside of the printed circuit board layer 104, which is put in place after the resonance space 102 has been recessed. Thereafter the high-frequency substrate 105 is glued into place, which, for example, measures 0.127 mm in thickness. Of course other thicknesses may also be possible, depending on requirements and on the frequency of the electromagnetic waves.

Figure 2:
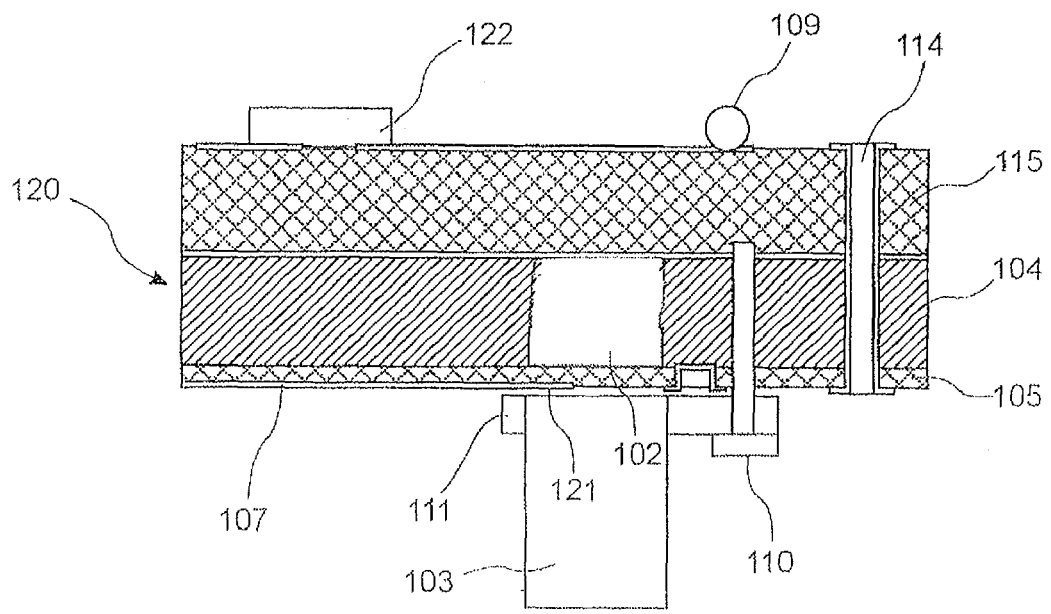
FIG. 2 is a diagrammatic cross-sectional view of a waveguide transition according to a further exemplary embodiment of the present invention.

According to one exemplary embodiment of the present invention the depth 112 of the resonance space corresponds to the thickness 113 of the printed circuit board layer 104, as shown in FIG. 2. In the present case, the depth 112 of the resonance space is less than the thickness 113 of the printed circuit board layer 104. The diameter of the resonance space 102 corresponds for example to the diameter of the waveguide 103.

Furthermore, through-hole plating (via) 108 is provided, which connects the metallic layer 106 between the HF substrate 105 and the printed circuit board layer 104 through the HF substrate 105 with its underside 117. Such through-hole plating 108 is for example circular in shape. Of course other cross sections may also be possible. Furthermore, through-hole plating 108 may be used for adjusting the waveguide 103. To this effect the waveguide 103 may comprise an alignment pin 118 that interacts with the recess of the through-hole plating 108. However, such an alignment pin 118 is not mandatory.

The waveguide transition has been created from a printed circuit board 120 that is designed as a multilayer printed circuit board. In this arrangement the multilayer printed circuit board comprises the printed circuit board layer 104 that carries the resonance space 102, as well as comprising a printed circuit board layer 115 that is arranged above the former and is for example made from the same material, e.g. FR-4. For example a metallic layer 119 has been placed between the two printed circuit board layers 104, 115. Furthermore, through-hole plating 114 (via) can be provided, which conductively connects the top of the upper printed circuit board layer 115 to the metallization on the underside of the HF substrate 105 and/or to the inner layers 119 or 106.

At the top of the printed circuit board layer 115, electronic components 122, 109 may be arranged, which for example comprise evaluation electronics or the electronics required for generating the high-frequency waves.

The HF substrate 105 may be designed such that it completely covers the resonance space 102. In this way the resonance space is in particular protected against dirt ingress. However, it may also be possible to provide one or several air outlets 301 (see FIG. 3) in order to make possible air equalization between the resonance space 102 and the environment or the interior of the waveguide 103.

Furthermore, the resonance space may can be filled with a suitable dielectric material, as shown in FIG. 1 (e.g. Teflon or printed circuit board material).

FIG. 2 is a diagrammatic cross-sectional view of a waveguide transition according to a further exemplary embodiment of the present invention. The transition shown in FIG. 2 essentially corresponds to the transition shown in FIG. 1. However, in FIG. 2 the layer 104 is not an insulating printed circuit board but instead is a metal board that comprises a milled out space for the resonance space 102.

Due to the metallic, current-conducting design of the board 104 there may be no need for a metallic layer 106 between the board 104 and the HF substrate 105. The attachment screw 110 may be directly screwed to the metal board 104, or it can be attached in some other way to the metal board 104. There may be no need for any leadthrough of the attachment screw 110 through the entire multilayer plate 120.

Figure 3:
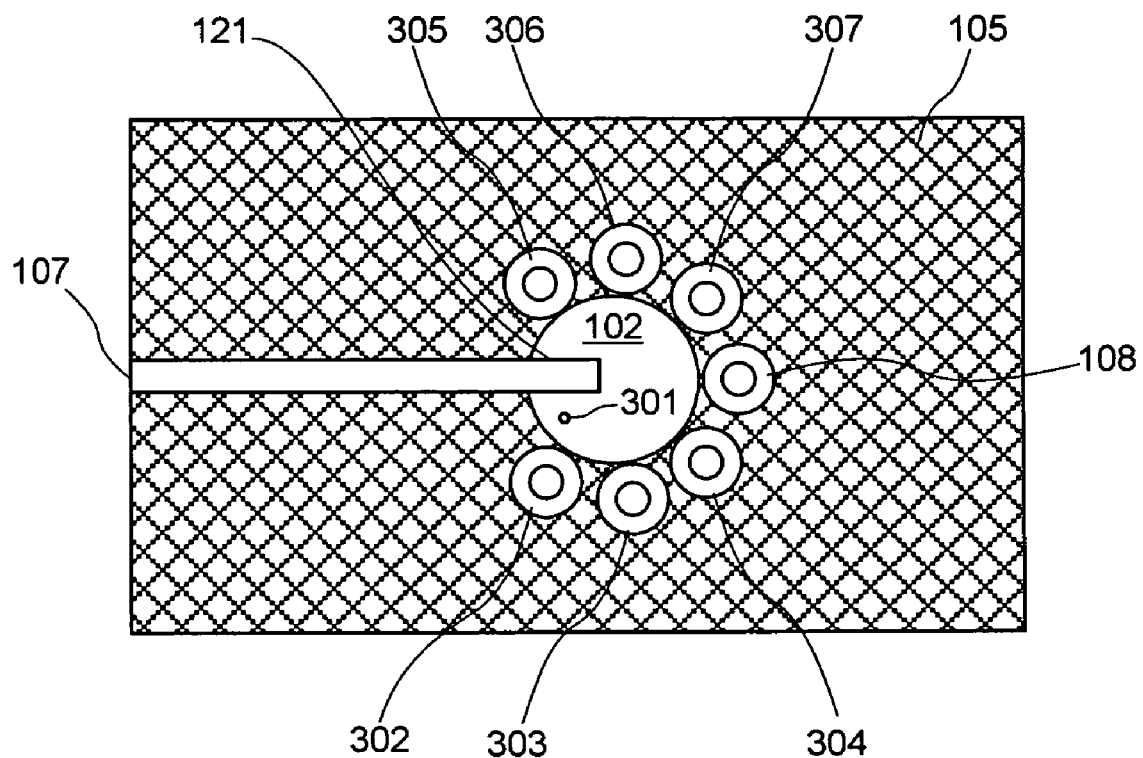
FIG. 3 is a diagrammatic top view of a waveguide transition according to one exemplary embodiment of the present invention.

FIG. 3 is a diagrammatic top view of a waveguide transition according to one exemplary embodiment of the present invention. As shown in FIG. 3, the microstrip-waveguide transition comprises a feed line that has been achieved by the strip-shaped metallization 107 on the underside of the HF substrate 105 (see FIG. 1) as a microstrip line. This feed line is used to conduct high-frequency electromagnetic waves from a signal source to the coupling element 121 and the resonance space 102 (and back).

Furthermore, instances of through-hole plating 108, 302, 303, 304, 305, 306, 307 are provided, which interconnect at least the two metallization planes on the top and bottom of the high-frequency substrate 105 (see FIG. 1). Such through-hole plating may also reach through the entire printed circuit board and can thus interconnect several metallization layers (e.g. 105, 119 (see FIG. 1)). Such through-hole plating 108, 302 to 307 can for example be circular in shape, and may in addition also be used for the purpose of adjusting the waveguide 103 (see FIG. 1). To this effect the waveguide 103 may comprise corresponding alignment pins 118 (see FIG. 1). However, this is not mandatory as the waveguide 103 (see FIG. 1) may also be adjusted in some other way.

Furthermore, FIG. 3 shows a drill hole 301 that is used to provide air equalisation equalization between the resonance space and the environment or the hollow space.

Dimensioning of the microstrip-waveguide transition may be designed for frequencies of, for example, 60 to 100 GHz. However, the microstrip-waveguide transition according to the invention may easily be designed also for higher frequencies in that the dimensions are correspondingly reduced.

Figure 4:
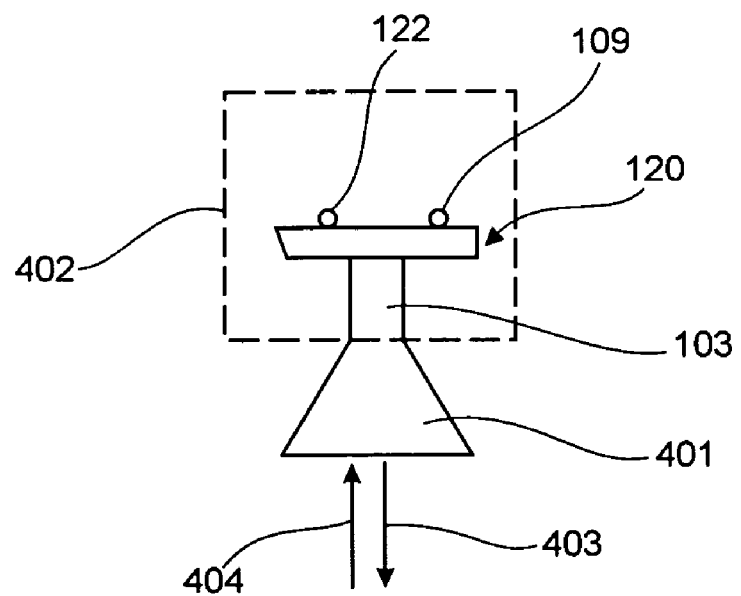
FIG. 4 is a diagrammatic view of a fill level radar according to a further exemplary embodiment of the present invention.

FIG. 4 is a diagrammatic view of a fill level radar according to one exemplary embodiment of the present invention. In this arrangement the fill level radar, which is provided to determine the fill level in a tank, comprises an antenna 401 for transmitting or receiving electromagnetic waves 403, 404, and a feed device 402 for feeding the electromagnetic waves to the antenna. Among other things the feed device comprises a waveguide 103 for conveying the electromagnetic waves 403, 404 between the antenna 401 and the feed line 107 (see FIG. 1). Furthermore, the feed device 402 comprises a microstrip-waveguide transition as described in FIGS. 1 to 3.

The antenna 401 may for example be designed as a horn antenna or as a parabolic antenna.

Figure 5:
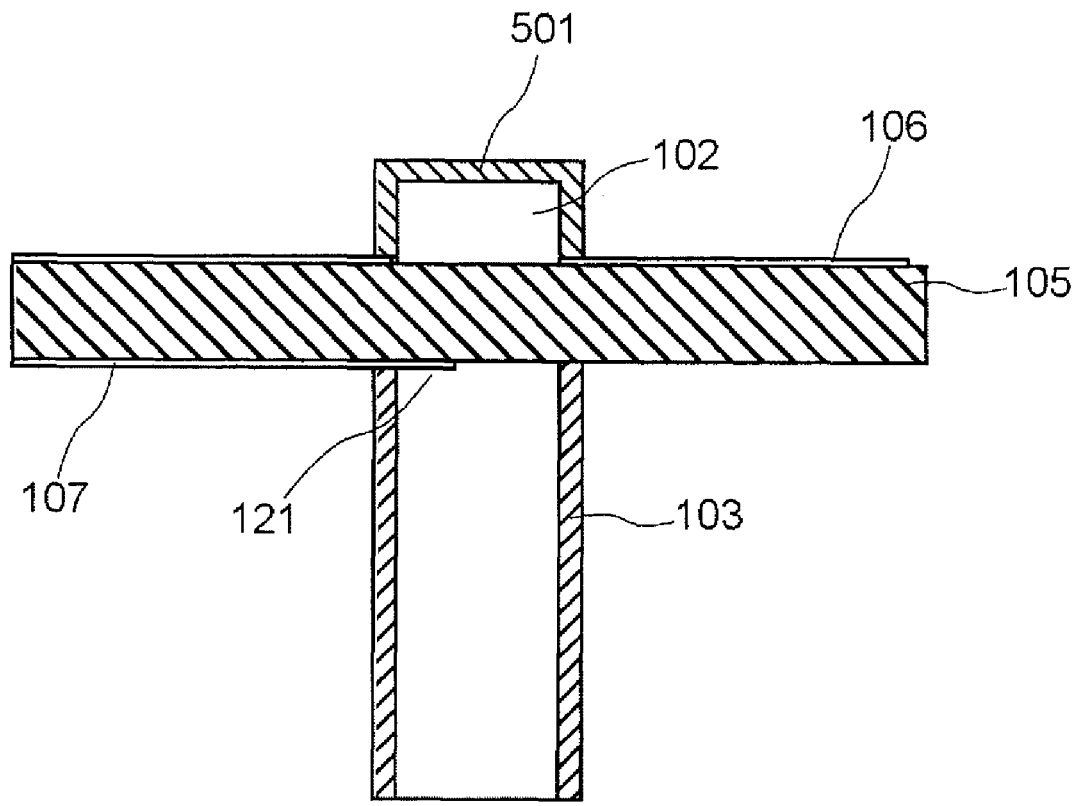
FIG. 5 shows an example of the prior art.

FIG. 5 shows a transition from a microstrip line 107 to a waveguide 103 according to the prior art. The high frequency led by the microstrip line is conveyed, by way of the coupling element 121, into the waveguide 103, which on one side is closed off with the resonator 102. The resonator is, for example, designed as a cover 501 with a blind hole as the resonance space. This cover 501 is then screwed, glued, or wedged or jammed onto the printed circuit board 105, or is attached in some other manner. In this arrangement precise alignment between the cover aperture and the waveguide aperture may be important. At the same time the printed circuit board has to be positioned precisely. Furthermore, no components may be placed on the rear of the printed circuit board 105 in the region of the cover 501.

In addition it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

What is claimed is:

1. A waveguide transition for a fill level radar, comprising:
a multilayer printed circuit board comprising a first layer;
a feed line for conducting electromagnetic waves; and
a decoupling unit that comprises a coupling element and a resonance space for decoupling the electromagnetic waves from the feed line into a waveguide;
wherein the resonance space is a recess integrated in the first layer, the recess in the first layer having surfaces, the waveguide transition further comprising a metallic coating disposed on the first layer, the metallic coating extending into the recess to coat all the surfaces of the recess, and
wherein the metallic coating is disposed on the whole of the first layer.

2. The waveguide transition according to claim 1,
wherein the printed circuit board comprises a second layer;
wherein the second layer comprises an insulating material; and
wherein the second layer is arranged adjacent to the first layer so that the second layer covers the resonance space.

3. The waveguide transition according to claim 2, wherein the first layer is an insulating printed circuit board substrate material.

4. The waveguide transition according to claim 2,
wherein the feed line is, for substantially all of its length, integrated in the second layer.

5. The waveguide transition according to claim 2,
wherein the resonance space has a depth;
wherein the depth of the resonance space is less than the thickness of the first layer.

6. The waveguide transition according to claim 2,
wherein the second layer is a high-frequency substrate.

7. The waveguide transition according to claim 2,
wherein the first layer is a high-frequency substrate.

8. The waveguide transition according to claim 2,
wherein the resonance space is filled with a dielectric material.

9. A fill level radar for determining the fill level in a tank, comprising:
an antenna for at least one of transmitting and receiving electromagnetic waves; and
a feed device for feeding the electromagnetic waves to the antenna;
wherein the feed device comprises a waveguide transition according to claim 1;
wherein the feed device comprises a waveguide for conveying the electromagnetic waves between the antenna and the feed line.

10. The fill level radar according to claim 9,
wherein by way of an attachment means the waveguide is connected to the printed circuit board in such a way that the electromagnetic waves can be decoupled, by way of the decoupling unit that comprises the resonance space and the coupling element, from the feed line into the waveguide.

11. The waveguide transition according to claim 1,
wherein the feed line is designed as a microstrip.

12. The waveguide transition according to claim 1,
wherein the feed line is designed to conduct first electromagnetic waves of a frequency of between 60 gigahertz and 100 gigahertz; and
wherein the decoupling unit is designed for decoupling second electromagnetic waves of a frequency of between 60 gigahertz and 100 gigahertz from the feed line to the waveguide.

13. The waveguide transition according to claim 1,
wherein the waveguide transition is integrally produced in a process of producing the printed circuit board.

14. A waveguide transition transition for a fill level radar, comprising:
a multilayer printed circuit board comprising a first layer;
a feed line for conducting electromagnetic waves; and
a decoupling unit that comprises a coupling element and a resonance space for decoupling the electromagnetic waves from the feed line into a waveguide;
wherein the resonance space is a recess integrated in the first layer, the recess in the first layer having surfaces, the waveguide transition further comprising a metallic coating disposed on the first layer, the metallic coating extending into the recess to coat all the surfaces of the recess,
wherein the printed circuit board comprises a second layer,
wherein the second layer comprises an insulating material,
wherein the second layer is arranged adjacent to the first layer so that the second layer covers the resonance space, and
wherein the second layer comprises a leadthrough in a region of the decoupling unit so as to provide pressure equalization between the resonance space and an environment.

* * * * *